Oct. 10, 1939.    C. R. SHARAR    2,175,413
HYDRAULIC CLUTCH
Original Filed Oct. 23, 1936

INVENTOR.
CHESTER R. SHARAR.
By Martin P. Smith, Atty.

Patented Oct. 10, 1939

2,175,413

UNITED STATES PATENT OFFICE 2,175,413

HYDRAULIC CLUTCH

Chester R. Sharar, Los Angeles, Calif.

Substitute for abandoned application Serial No. 107,180, October 23, 1936. This application January 14, 1939, Serial No. 251,043

4 Claims. (Cl. 192—58)

This application is a substitute for application Serial Number 107,180 filed October 23, 1936.

My invention relates to a hydraulic clutch for the transmission of rotary motion and power from one rotary member to another, for instance, from the crank shaft of an engine to the driving shaft of a motor vehicle, and the principal object of my invention is to provide a relatively simple, inexpensive and effective clutch of the type wherein a circular rotor is eccentrically mounted for operation within a circular chamber, the latter being formed in a housing that functions as a fly-wheel, and the rotor carrying a pair of connected plates that are arranged to slide diametrically through the rotor.

Further objects of my invention are, to generally improve upon and simplify the construction of the existing forms of hydraulic clutches; further, to provide a clutch that is devoid of all friction bands, drums and the like, and which latter elements in service develop trouble due to overheating; and, further, to provide simple and efficient means for moving the plates carried by the rotor inwardly or outwardly so as to very accurately regulate and control the speed that is transmitted from the driving shaft to the driven shaft.

With the foregoing and other objects in view, my invention consists in certain novel features of construction and arrangement of parts that will be hereinafter more fully described and claimed and illustrated in the accompanying drawing, in which:

Figure 1:
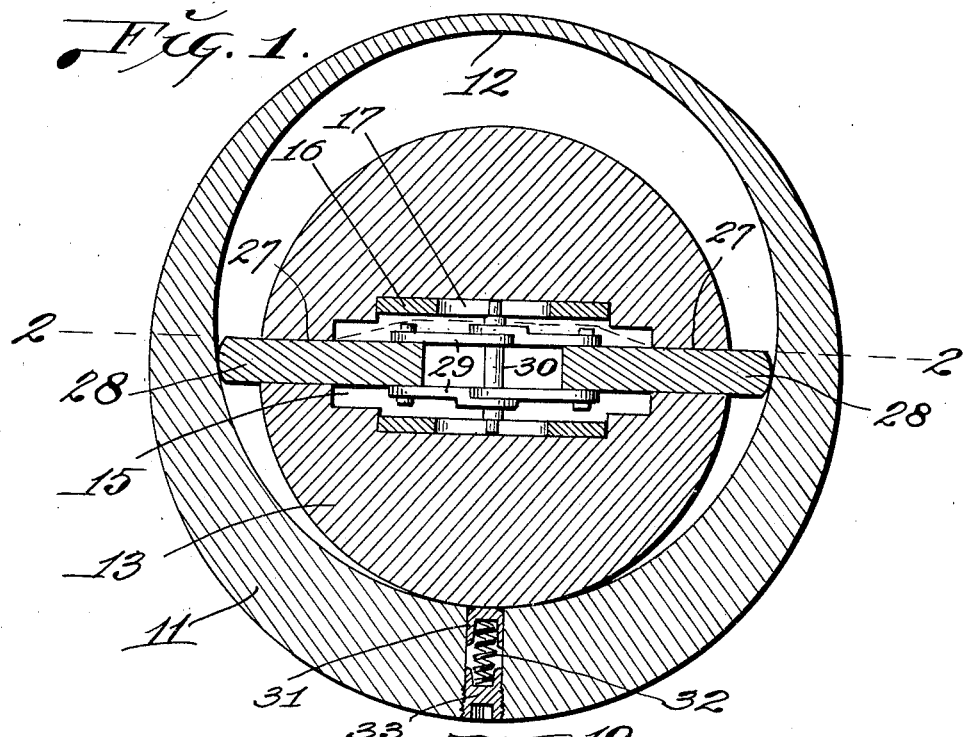
Fig. 1 is a vertical section taken through the center of a hydraulic clutch constructed in accordance with my invention.
Figure 2:
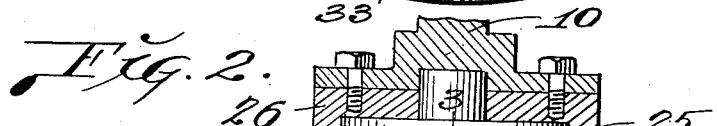
Fig. 2 is a horizontal section taken on the line 2—2 of Fig. 1.
Figure 2:
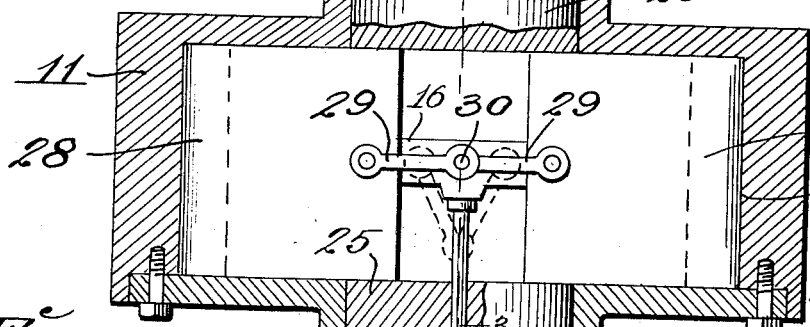
Figure 3:
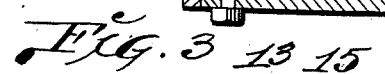
Fig. 3 is a cross section taken on the line 3—3 of Fig. 2.
Figure 3:
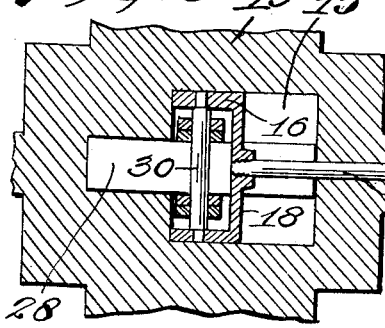
Figure 4:
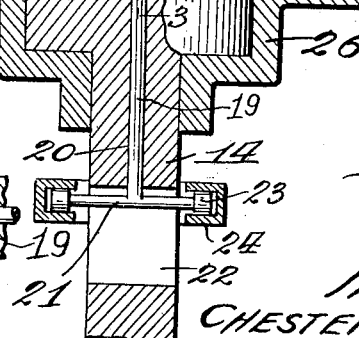
Fig. 4 is a perspective view of a yoke that is utilized as a connection between the sliding plates carried by the rotor and for simultaneously moving said plates toward or away from each other.
Figure 4:
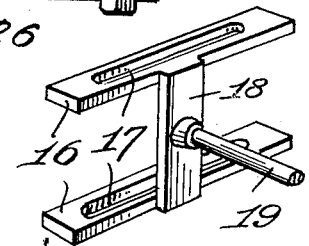

Referring by numerals to the accompanying drawing which illustrates a preferred embodiment of my invention, 10 designates a driving shaft, for instance, the crank shaft of an internal combustion engine, and suitably secured thereto is a circular housing 11 which, in operation, performs the function of a fly-wheel for the driving shaft. The housing 11 may be formed in two or more parts to facilitate assembly.

The chamber 12 that is formed in housing 11, is eccentrically arranged with respect to the axis of said housing, and which axis is coincident with the axis of the driving shaft 10 and eccentrically arranged within chamber 12 is a circular rotor 13, the axis of which is coincident with the axis of housing 11 and driving shaft 10. Thus a substantially crescent-shaped chamber is formed between the periphery of the rotor 13 and the inner face of the wall of housing 11 that surrounds the chamber 12. The side of rotor 13 opposite the side that is positioned adjacent the end of the driving shaft 10, is rigidly connected in any suitable manner to a driven shaft 14.

Formed in the central portion of the rotor 13 is a substantially rectangular chamber 15 within which is arranged for transverse sliding movement a frame or yoke comprising a pair of spaced plates 16 in which are formed corresponding longitudinally disposed slots 17. These plates 16 are connected on one side by a centrally arranged cross plate 18 and connected to the center of said cross plate is a rod 19 that extends through the side of the rotor and axially through a bore 20 that is formed in the driven shaft 14.

The outer end of this rod 19 is connected to a cross rod 21 that is arranged for sliding movement in a slot 22 that is formed in the driven shaft 14. The ends of cross rod 21 carry rollers 23 that are positioned in a channel-shaped yoke or ring 24, and which latter may be moved lengthwise of the driven shaft 14 by suitable manually or pedally-actuated means.

The rotor 13 is provided on its sides with large trunnions 25 that are mounted for rotation in suitable bearings 26 formed on the sides of the housing 11.

Formed through the body of the rotor between the trunnions 25 are diametrically disposed slots 27, the inner ends of which communicate with the ends of the chamber 15, and arranged for sliding movement through these slots are plates or vanes 28, the outer ends of which are adapted to engage the inner circular fame of chamber 12.

Pivotally connected to the plates 28 adjacent their inner edges, are the outer ends of pairs of links 29, and the inner ends of the members of each pair of links overlap each other, and passing through said overlapping ends is a pin 30, the ends of which are arranged for sliding movement in the slots 17 in the posts 16.

The construction just described provides means for simultaneously moving the plates or vanes 28 toward or from each other, and the slots 17 in the plates 16 permit the plates 28 connected by the links 29 to move diametrically through the rotor as the latter rotates in the eccentric chamber 12.

Seated in the circular wall of the housing 11 at the point where the periphery of the rotor 13 contacts with the circular face of chamber 12 is a transversely disposed packing member 31 that is yieldingly forced into contact with the periphery of the rotor by expansion springs 32, the latter being seated in pockets behind the packing member, and the outer ends of which pockets are closed by screw plug 33.

The eccentric chamber 12 within the housing 11 is filled with a heavy liquid, for instance oil, glycerine or the like, and as the engine driven shaft 10 is rotated, housing 11 will be correspondingly rotated, and to transmit this motion to shaft 14, yoke or ring 24 is moved inwardly toward the clutch, thereby moving rod 19 through bore 20 and the yoke comprising the parts 16 and 18 will be moved from a position adjacent the side of the rotor toward the center thereof. As a result of this movement and the engagement of the ends of the pin 30 in the slots 17 of the yoke, the ends of the links 29 that are pivotally connected to the plates 28 will be spread apart, thereby moving said plates outwardly so that their outer ends approach the circular inner face of chamber 12.

As the outer ends of the plates 28 approach the circular face of chamber 12 the pressure of the projecting ends of the plates against the heavy liquid in chamber 12 will act to pick up and impart movement to the rotor 13 and as the plates continue to move outwardly the speed of the transmitted rotary motion will be correspondingly increased.

When the outer ends of the plates 28 engage the circular inner face of chamber 12, it will be impossible for the liquid to flow past the outer ends of the plates, with the result that the rotor 13 will rotate at the same speed as the engine driven shaft 10 and the housing that is connected thereto and which encloses the rotor.

Obviously, by moving the yoke or ring 24 toward or away from the clutch housing and correspondingly shifting the positions of the plates 28, the speed transmitted from the driven shaft to the rotor 13 and shaft 14 may be very accurately regulated, and such transmission of speed is effected without the use of drums, bands, gears, friction plates and the like.

When the plates 28 have been shifted to their outer limits of movement, so that their outer ends engage the inner circular face of chamber 12, said plates and the links connecting the same must necessarily move diametrically through the rotor, due to the eccentric position of the rotor within chamber 12, and such movement is permitted by reason of the fact that the ends of the pin 30 that connect the overlapping ends of links 29 are free to move lengthwise through the slots 17 of the plates 16.

During operation, and while the plates 28 are moving so that their outer ends project beyond the periphery of rotor 13, pressure is produced in the liquid on one side of the projecting portion of each plate, and suction is produced on the liquid on the other side of the projecting portion of each plate, and this suction and pressure is effective in transmitting rotary motion and power from the driving shaft and the housing to the rotor 13 and driven shaft 14.

Thus it will be seen that I have provided a hydraulic clutch that is relatively simple in construction, inexpensive of manufacture and composed of but few parts, and which clutch is very effective in performing the functions for which it is intended.

It will be understood that minor changes in the size, form and construction of the various parts of my improved hydraulic clutch may be made and substituted for those herein shown and described without departing from the spirit of the invention, the scope of which is set forth in the appended claims.

I claim as my invention:

1. In a hydraulic clutch, a housing provided with an eccentrically arranged circular chamber, a rotor arranged for operation within said chamber, the axis of which rotor is coincident with the axis of the housing, a pair of plates arranged to slide diametrically through said rotor, links connecting the inner portions of said plates, and a yoke operable from the exterior of the housing for imparting movement to said links and moving said plates toward or away from each other.

2. In a hydraulic clutch, a housing provided with an eccentrically arranged circular chamber, a rotor arranged for operation within said chamber, the axis of which rotor is coincident with the axis of the housing, a pair of plates arranged to slide diametrically through said rotor, links connecting the inner portions of said plates, a yoke operable from the exterior of the housing for imparting movement to said links and moving said plates toward or away from each other, and the said links having sliding engagement with said yoke.

3. In a hydraulic clutch, a housing provided with an eccentrically arranged circular chamber, a rotor arranged for operation within said chamber, the axis of which rotor is coincident with the axis of the housing, a pair of plates arranged to slide diametrically through said rotor, links connecting the inner portions of said plates, a yoke operable from the exterior of the housing for imparting movement to said links and moving said plates toward or away from each other, a driving shaft connected to one side of said housing, and a driven shaft connected to said rotor.

4. The combination with a driving shaft, of a housing connected to said shaft, said housing having an eccentrically arranged chamber, a rotor arranged for operation within said chamber, a shaft connected to said rotor, the axes of the two shafts and the rotor being coincident, a pair of plates arranged to slide diametrically through said rotor, links connecting said plates, means operable from the exterior of the housing for imparting swinging movement to said links to move said plates toward or away from each other, and a yoke arranged for sliding movement within said rotor and having sliding movement with said links.

CHESTER R. SHARAR.